(12) United States Patent
Sen et al.

(10) Patent No.: US 6,845,389 B1
(45) Date of Patent: Jan. 18, 2005

(54) SYSTEM AND METHOD FOR BROADBAND MULTI-USER COMMUNICATION SESSIONS

(75) Inventors: Sanjoy Sen, Plano, TX (US); Venson Shaw, Plano, TX (US); Hrishikesh Gossain, Dallas, TX (US); Thinh Nguyen, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 790 days.

(21) Appl. No.: 09/745,746

(22) Filed: Dec. 21, 2000

Related U.S. Application Data

(60) Provisional application No. 60/203,761, filed on May 12, 2000.

(51) Int. Cl.[7] .............................................. G06F 15/16
(52) U.S. Cl. ...................... 709/204; 709/204; 709/217
(58) Field of Search .............................. 709/204, 217, 709/218, 219, 226, 227, 229

(56) References Cited

U.S. PATENT DOCUMENTS

| | | | | |
|---|---|---|---|---|
| 6,018,766 A | * | 1/2000 | Samuel et al. ............... | 709/218 |
| 6,366,577 B1 | * | 4/2002 | Donovan ..................... | 370/352 |
| 6,463,078 B1 | * | 10/2002 | Engstrom et al. ........... | 370/466 |
| 6,523,065 B1 | * | 2/2003 | Combs et al. ............... | 709/226 |
| 6,553,006 B1 | * | 4/2003 | Kalliokulju et al. ......... | 370/310 |
| 6,587,875 B1 | * | 7/2003 | Ogus .......................... | 709/223 |
| 6,680,943 B1 | * | 1/2004 | Gibson et al. .............. | 370/392 |
| 6,681,252 B1 | * | 1/2004 | Schuster et al. ............ | 709/227 |

\* cited by examiner

*Primary Examiner*—Frantz B. Jean
*Assistant Examiner*—Yasin Barqadle

(57) ABSTRACT

A system and method of setting up a multi-user communication session over a global computer network are provided. The method includes first sending a session participation request message from a first user to a second user, where the session participation request message includes the first user's QoS requirements for the session. The second user then sends a negotiating message to the first user in response to receiving the session participation request message, where the negotiation message includes the second user's QoS requirements for the session responsive to the first user's QoS requirements. The resource availability in access networks of the first and second users according to the second user's QoS requirements is determined, and resources in the respective access networks of the first and second users are then reserved in response to resources being available to achieve the second user's QoS requirements. The first user thereafter sends an acknowledgement message to the second user in response to receiving the negotiating message to indicate the completion of QoS provisioning.

41 Claims, 3 Drawing Sheets

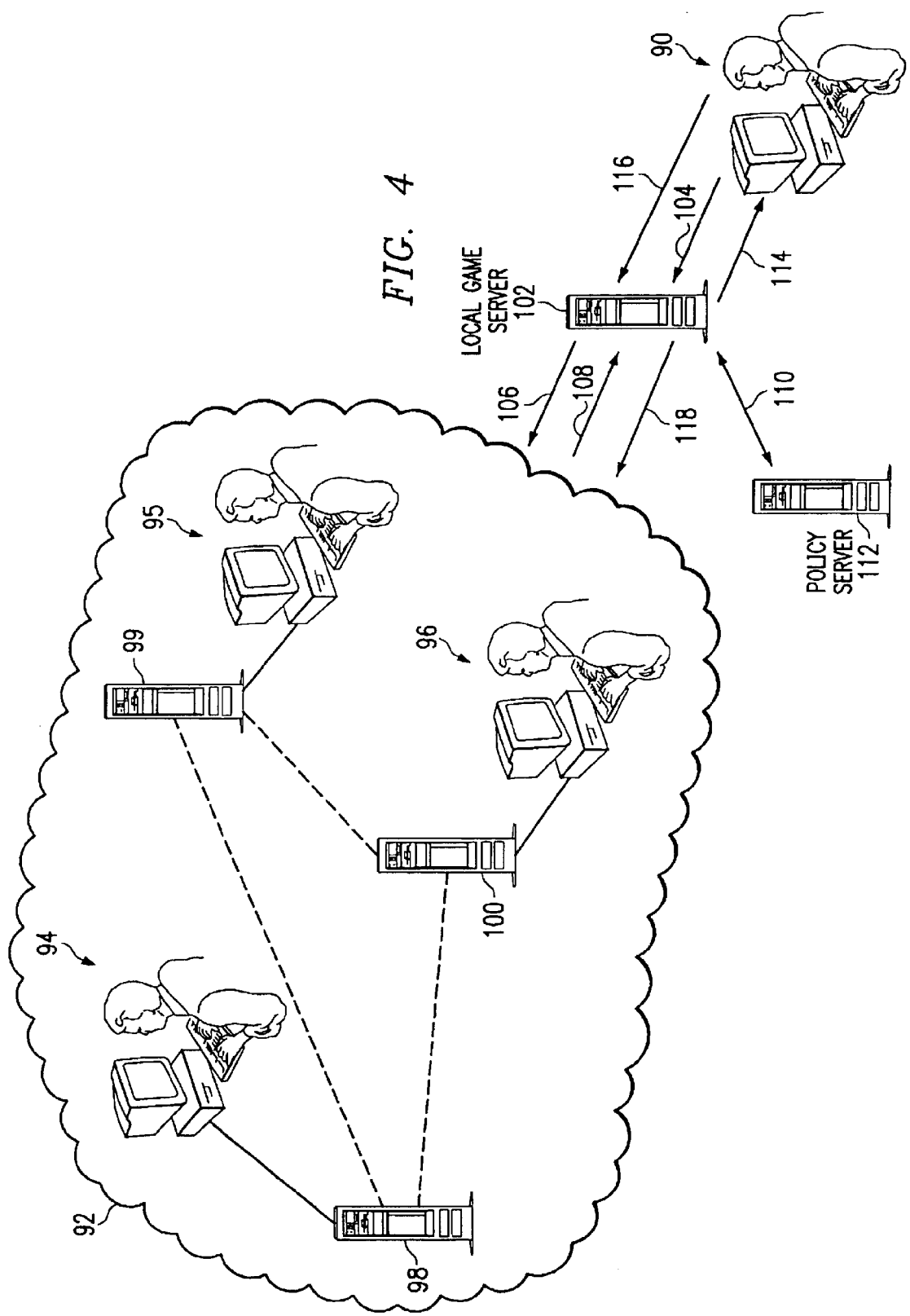

SYSTEM AND METHOD FOR BROADBAND MULTI-USER COMMUNICATION SESSIONS

CROSS-REFERENCE TO RELATED APPLICATION

This patent application claims the benefit of Provisional Patent Application Ser. No. 60/203,761, entitled Distributed Broadband Access Network Architecture System and Method, filed on May 12, 2000. This patent application is related to co-pending patent application Ser. No. 09/746,104, entitled System and Method for Joining a Broadband Multi-User Communication Session, filed on Dec. 21, 2000.

FIELD OF THE INVENTION

This invention relates to telecommunications equipment and networks, and more particularly, to a system and method for broadband multi-user communication sessions such as e-gaming.

BACKGROUND OF THE INVENTION

Public groupware and multi-user gaming are popular new Internet applications. However, their functionality and performance are limited and unappealing because the users find the current environment to have jerky interaction, infrequent screen updates, unacceptably slow speed, and lack of realism. These problems are primarily due to the lack of bandwidth over the Internet. Currently, when two or more users participate in the same multi-user session, each user has to be logged in at a central computer server. Therefore, the capacity of the central computer server becomes a constraint on the number of users that can participate simultaneously. The central server becomes a bottleneck and the architecture is not easily scalable to accommodate more users. There is also a lack of quality of service (QoS) support to improve the realism of the gaming session. As a result, although a community of online game players currently participate and play games over the Internet, their numbers have been limited. Since QoS is not guaranteed, the billing model for e-gaming service today is primitive and allows only free gaming or pay-in-advance.

Online gaming is important to broadband emerging service providers (broadband ESP) today because it makes an Internet site "sticky." The metric by which Internet sites are valued today is not only the number of hits per day but also by the average amount of time a user spends at the site (stickiness). Online gaming provides content that not only increases the number of hits, but also makes a user linger at the site. Furthermore, the longer users stay at a site, the more targeted or untargeted advertisement can be shown to the users, which translates to more revenue opportunities. Online gaming also creates the feeling of an online community that allows the broadband ESP to bundle other broadband premium services like video, streaming advertisements, music, etc.

SUMMARY OF THE INVENTION

It may be seen from the foregoing that it is desirable to support advanced e-gaming services to provide scalability, QoS, and a mechanism for billing to overcome the problems associated with the central server. In particular, the present invention supports QoS provisioning, and avoids the bottleneck of routing gaming communications such as players' moves and other input through a game server.

In accordance with an embodiment of the present invention, a method of setting up a multi-user communication session over a global computer network is provided. The method includes first sending a session participation request message from a first user to a second user, where the session participation request message includes the first user's QoS requirements for the session. The first user receives a negotiating message from the second user in response to the session participation request message, where the negotiation message includes the second user's QoS requirements for the session responsive to the first user's QoS requirements. The resource availability in access networks of the first and second users according to the second user's QoS requirements is determined, and resources in the respective access networks of the first and second users are then reserved in response to resources being available to achieve the second user's QoS requirements. The first user thereafter sends an acknowledgement message to the second user in response to receiving the negotiating message to indicate the completion of QoS provisioning.

In accordance with another embodiment of the present invention, a method of setting up an e-gaming session played over a global computer network is provided.

The first player sends a session participation request message to a second player via a first game server, where the session participation request message includes the first player's QoS requirements for the session. The first player receives a negotiating message from the second player via a second game server in response to the session participation request message, where the negotiation message includes the second player's QoS requirements for the session responsive to the first player's QoS requirements. The resource availability in the second player's access network is determined according to the second player's QoS requirements, and resources in the second player's access network are reserved in response to resources being available to achieve the second player's QoS requirements. The negotiating message is then forwarded from the second game server to the first game server. The resource availability in the first player's access network is determined according to the second player's QoS requirements and the resources in the first player's access network are reserved in response to resources being available to achieve the second user's QoS requirements. An acknowledgement message is then sent from the first player directly to the second player in response to receiving the negotiating message to indicate the completion of QoS provisioning.

In accordance with yet another embodiment of the present invention, a multi-user communication system over a global computer network includes a first server onto which a first user is logged, a first policy server in communication with the first server, a second server onto which a second user is logged, and a second policy server in communication with the second server. The first user sends a session participation request message to the second user via the first and second servers, where the session participation request message includes the first user's QoS requirements for the session. The second user then send a negotiating message to the second server user in response to receiving the session participation request message, where the negotiation message includes the second user's QoS requirements for the session responsive to the first user's QoS requirements. The second policy server determines resource availability in the second player's access network according to the second user's QoS requirements and reserves resources in the second user's access network in response to resources being available to achieve the second user's QoS requirements. The negotiating message is then forwarded from the second server to the first server. The first policy server also determines resource availability in the first player's access network according to the second user's QoS requirements and reserves resources in the first player's access network in response to resources being available to achieve the second user's QoS requirements. The negotiating message is forwarded from the first server to the first user. The first user then sends an acknowledgement message directly to the second user in response to receiving the negotiating message to indicate the completion of QoS provisioning.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

For a more complete understanding of the present invention, the objects and advantages thereof, reference is now made to the following descriptions taken in connection with the accompanying drawings in which:

FIG. 4 is a message flow diagram of a player joining an ongoing e-game session process according to the teachings of an embodiment of the present invention.

DETAILED DESCRIPTION OF THE DRAWINGS

The preferred embodiment of the present invention and its advantages are best understood by referring to FIGS. 1 through 4 of the drawings, like numerals being used for like and corresponding parts of the various drawings.

Figures 1, 2:
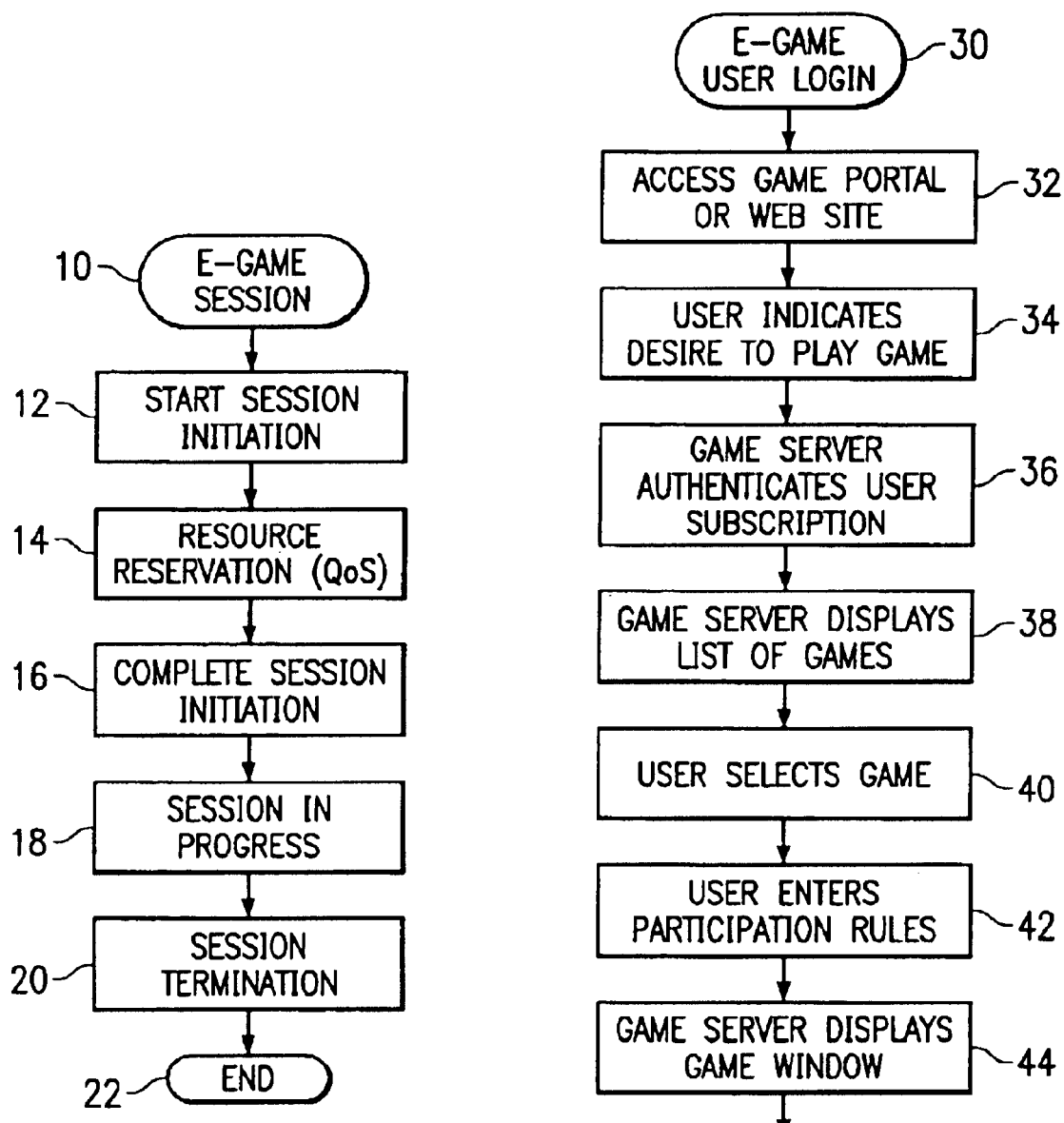
FIG. 1 is a simplified flowchart of an e-game session according to the teachings of an embodiment of the present invention.
FIG. 2 is a simplified flowchart of an e-game login process according to the teachings of an embodiment of the present invention.

FIG. 1 is a simplified flowchart of an e-game session 10 according to the teachings of an embodiment of the present invention. The terms "e-game," "on-line game" and "web-based game" are used substantially synonymously herein to refer to a game session in which players' moves as well as the game text, graphics, audio, and video data are relayed over the Internet or a global computer network. At the beginning of an e-game session, the game session is initiated and setup at a game server local to a user. In the distributed e-gaming architecture of the present invention, each administrative domain is served by at least one local game server, and the game servers are operable to communicate with one another in a peer-to-peer fashion. The local game server sets up the e-game session, as shown in block 12, and also reserves resources needed to support the quality of service (QoS) required for the session, as shown in block 14. The local game server may obtain the user name and password, and authenticates the user's authorization to play. This may include verifying the user's subscription to game playing, if applicable, or verifying the user's payment methods. The session initiation is then completed in block 16, and game play proceeds in block 18. Usage records for the session are then generated to facilitate billing. Unlike conventional e-gaming sessions, the players play directly against or with each other without redirecting the gaming data through any game server. In block 20, the e-game session terminates, at which time the local game server may obtain the session usage records and post the records for billing. The session terminates in block 22.

FIG. 2 is a simplified flowchart of an e-game login process 30 according to the teachings of an embodiment of the present invention. A user first enters a URL (uniform resource locator) or Internet address of a game portal or web site and accesses the site stored at a local game server, as shown in block 32. The user then indicates a desire to play a game, as shown in block 34. Typically, the user may click on an icon, button, or a link which initiates a download of a game web page to the player's computer. The player may enter his or her user name, password or other authenticating data so that the game server may verify that the player is a subscription user, or a registered user, as shown in block 36. Alternatively, the game portal may allow unregistered users to play selected games or try out a predetermined number of sessions without registration requirement or payment. In blocks 38 and 40, the local game server displays a list of games available to the player and the player selects a particular game. In response to the player's game selection, the game server displays a form or a series of questions designed to solicit the player's participation rules. The participation rules include the manner in which the player chooses to participate in the game (including, for example, player, strategist or spectator) and the capabilities of the player's computer. Thereafter, the game server displays a game window to the player, as shown in block 44, so that the player may begin to participate in the game, as shown in block 46. The user login process ends in block 48.

Future e-gaming will be a multimedia session in which audio, video, data (chat), game control messages will be exchanged. The ability for a player to join an ongoing session is also desirable. Protocols such as SEP (Session Initiation Protocol), SAP (Session Announcement Protocol) and SDP (Session Description Protocol) provide these features. For example, an SIP INVITE with SDP is used before the e-gaming session begins for capability exchange which includes codes for audio and video UDP ports for voice, video and gaming control messages. SAP is used to announce an ongoing e-gaming session to new players. After the session initiation and capabilities exchange phase, the gaming server initiates the resource reservation phase for packet cable by using QoS. After the resource reservation phase, the players are created and game session setup messages are exchanged.

Figure 3:
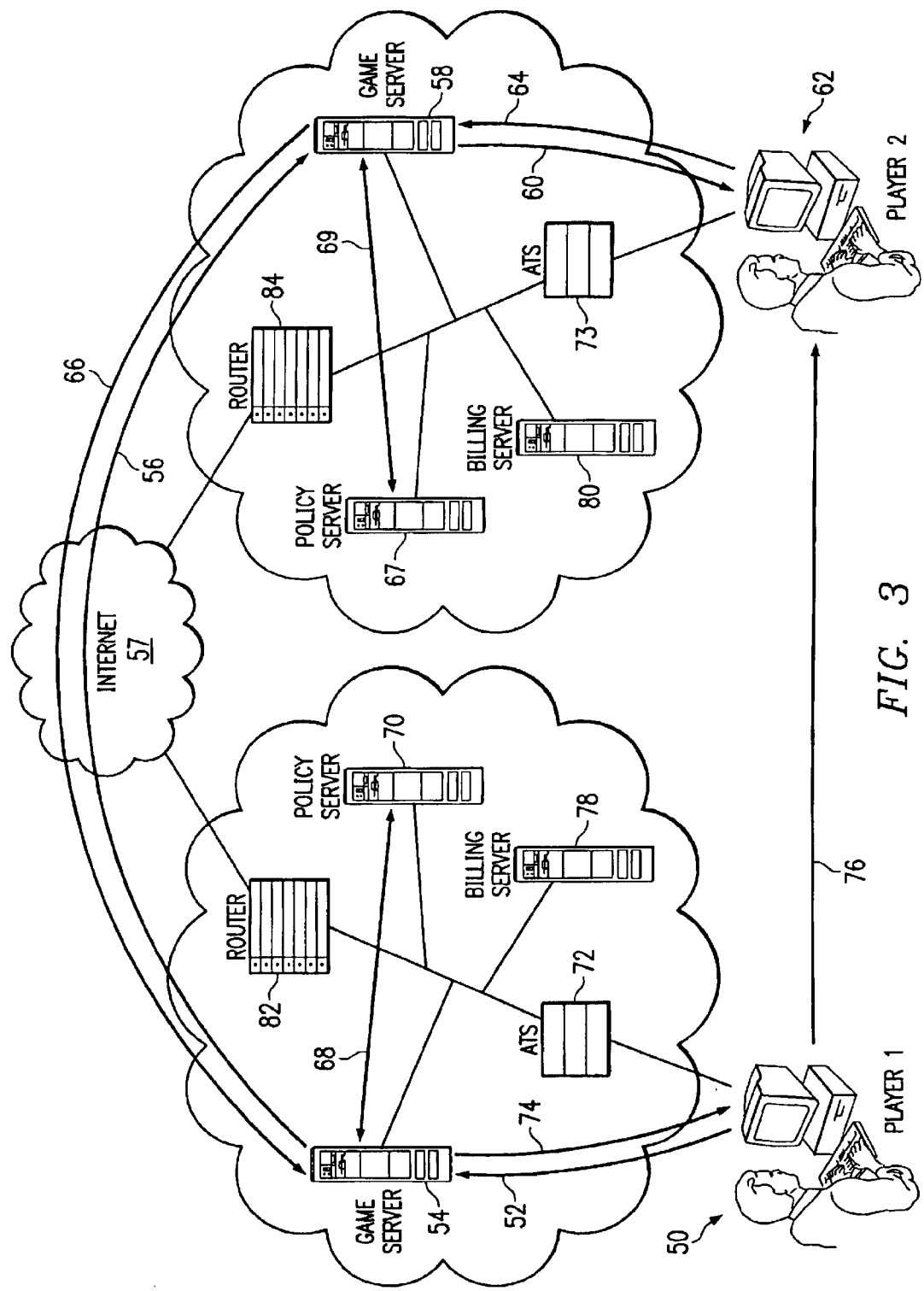
FIG. 3 is a message flow diagram of an e-game session initiation and resource reservation process according to the teachings of an embodiment of the present invention.

FIG. 3 is a message flow diagram of an e-game session initiation and resource reservation process according to an embodiment of the teachings of the present invention. A first player 50 (Player 1) sends a session participation request message 52 containing the name or identifier of a second player 62 (Player 2) to a local game server 54. Session participation request message 52 may include bandwidth requirements and the QoS requirements for the gaming session. For example, the QoS requirements may include end-to-end packet delay, maximum tolerable lag, etc. The session descriptor may also contain a description of the user's computer terminal capabilities, such as processing power, memory, modem speed, etc. The session setup protocol can use an extended SIP and SDP message set. The SIP can be extended to support QoS for different classes of games. For example, a class of games (Class 1) may be characterized by turn-based real-time game playing, such as chess, checkers, and cards; a second class of games (Class 2) may be characterized by real-time interactive games that preferably have latency less than 50 milliseconds, for example; a third class of games (Class 3) may be characterized by real-time action/simulation/role playing games where latency less than 50 milliseconds is required for optimal game play. Still a fourth class (Class 4) may be characterized by low-demand spectator and strategists in a gaming session which is satisfied by best efforts using available bandwidth.

The required QoS for a communication session may be directly correlated to the cost billed to the participant. The requested level of security may also be considered. The following table shows different billing types for e-gaming that can be accomplished with extended SDP contemplated by the present invention.

| BILLING | ID |
|---|---|
| Pay as You Play (time-based) | 1 |
| Pay Per Session | 2 |
| Subscription | 3 |
| Free Based on a Conditional Criteria | 4 |
| Free | 5 |

An example of an SIP INVITE with extended SDP message of the present invention to carry session information and billing information is shown below:

C->SI: INVITE sip:jerry@can.nortelnetworks.com SIP/2.0
  Via: SIP/2.0/UDP rich.us.nortelnetworks.com
  From: TOM <sip:tom@us.nortelnetworks.com>
  To: JERRY <sip:jerry@can.nortelnetworks.com>
  Call-ID: 2892326565@rich.us.nortelnetworks.com
  Cseq: 1 INVITE
  Subject: Lets Play Diablo game
  Content-Type: application/sdp
  Content-Length: . . .
  V=0
  0=tom 2346442901 2346444901 IN IP4 47.177.57.140
  s=Online Game
  I=A new e-Game called Diablo
  U=http://www.games.com/diable.pdf
  C=IN P4 games.rich.nortelnetworks.com
  T=2312349034 2312623423
  *M=application 42012 udp gm
  *B=50
  *A=qos:mandatory sendrecv 3
  *A=security:mandatory sendrecv
  *A=billing:mandatory 1

The C field may contain a unicast or multicast address. The fields marked with an "*" are or include extensions according to the present invention. M is used to specify the game format (gm) type; B is used to specify the required bandwidth or the latency requirement of 50 milliseconds; A indicates the QoS requirement of game classification level 3 and the security requirements, the security requirements, and the billing classification. The standard SIP protocol is described in "SIP: Session Initiation Protocol", Request For Comments 2543.

A game server 54 local to Player 1 then seeks out the game server for Player 2, one onto which Player 2 is logged in. Game server 54 searches its directory and proxies the message to that game server 58. If the second game server cannot be located, the INVITE message is forwarded to another server in the global computer network or Internet 57 which may be able to determine the address of the game server for Player 2. The following is an example of a message sent to Player 1 from game server 54 in response to the INVITE message.

S1->C: SIP/2.0 180 Ringing
  Via: SIP/2.0/UDP rich.us.nortelnetworks.com
  From: TOM <sip:tom@us.nortelnetworks.com>
  To: JERRY <sip:jerry@can.nortelnetworks.com>
  Call-ID: 2892326565@rich.us.nortelnetworks.com
  Cseq: 1 INVITE
  Content Length: 0

The INVITE message eventually reaches game server 58 and Player 2 (Paths 56 and 60, respectively). Player 2 may modify the session descriptor to suit his or her needs.

Player 2 then sends a negotiating message such as an SIP OK message with session QoS requirements (possibly modified) and his or her terminal capabilities to game server 58 (path 64), which forwards the message to game server 54 for Player 1 (path 66).

Before forwarding the OK message, game server 58 for Player 2 communicates the QoS requirement information to its policy server 67 (path 69), which invokes the QoS-enabling mechanism in the access network of Player 2.

On receiving the negotiating message (OK message), game server 54 of Player 1 communicates the QoS data to its policy server 70 (path 68). Policy server 70 makes an admission control decision at this point for the session, based on the requested QoS and resource availability. If Players 1 and 2 are successfully admitted, policy server 70 then triggers the access resource reservation phase (not shown) at its access terminator system (ATS) 72. After the access resource reservation is successfully completed, the OK message is forwarded to Player 1 by game server 54 (path 74). Player 1 then sends an "Acknowledgement" or ACK message directly to Player 2, as indicated by path 76. The ACK message can be routed directly without passing through the game servers because both players know each other's HP address through the "Session Participation Request" and the "Negotiating" messages. The receipt of the ACK message by Player 2 completes the capability negotiation and QoS provisioning phase session setup phase. The e-gaming session can now begin. ATS 72 and 73 or access concentrators/routers 82 and 84 may start generating usage records for the gaming session to facilitate billing.

In the present example, an assumption was made that resource reservation is required only in access. For cable, DOCSIS 1.1 resource allocation is invoked at a cable modem terminator system to support the QoS for various e-gaming sessions. The policy server also configures the routers in the access network to support the required QoS for the gaming session. If end-to-end resource reservation is needed, layer 3 reservation mechanisms such as Resource reservation Protocol, set forth in Request for Comments 2205, can be used.

After the session setup phase, the exchange of actual gaming messages between players begins. Each move or input of a player is encapsulated in a message and sent to the opponent player(s). In the present invention, the gaming messages can be sent directly between players via the Internet without passing through one or more game servers. In conventional e-gaming sessions these messages are transported over (UDP), an unreliable protocol and unsuitable for e-gaming. The player input and movement messages are not only time-critical, but also require lossless and reliable sequential delivery. A packet delivered out of order becomes meaningless. Lost packets may result in players' moves being lost. The game session is terminated by using the SIP BYE message sent by a user's computer to the local game server. This enables the termination of the session with respect to that particular player if more than two players are playing or the entire session if only two players are playing. Billing records are then generated for the terminating player(s).

Protocols such as DOCSIS 1.1 support the simultaneous transmission of multiple traffic flows over the cable medium providing the negotiated QoS guarantees. In the downstream direction the DOCSIS MAC can schedule traffic directly to meet the negotiated QoS. Therefore, special scheduling is not required. The upstream channel is contention-based and various types of polled/request/grant schemes are used to control the resource assignment and hence, the QoS, over the upstream channel. DOCSIS 1.1 allows negotiation of QoS parameters such as bandwidth, traffic priority, latency and jitter. DOCSIS 1.1 supports non-real-time polling, unsolicited grant, real-time polling and unsolicited grant with activity detection upstream scheduling services.

In non-real-time polling, the ATS sends an unicast polling message (REQUEST OPPORTUNITY) to the cable modem, for example. If there is data to send, the cable modem sends a REQUEST message to the ATS and is replied by a GRANT message by the ATS if resource is available. This method is suitable for non-real-time, bursty data applications such as web browsing and file transport protocol (FTP).

In unsolicited grant, periodic grants are sent by the ATS to the cable modem at fixed intervals. This is suitable for constant bit rate traffic like PCM-encoded voice. Strict jitter control is provided.

In real-time polling, ATS always provides periodic unicast polls. Thus any flow is guaranteed to receive periodic REQUEST OPPORTUNITY. This is suitable for bursty video or VoIP with silence suppression.

In unsolicited grant with activity detection, ATS provides unsolicited grant when the flow is activated and provides periodic unicast polls when the flow is inactive. This is suitable for VoIP traffic with comfort noise generation. Activity detection by the cable modem is required.

The data traffic generated by a player during e-gaming can be quite unpredictable and bursty. However, once a message is generated, it needs to be delivered to the other player(s) within the shortest possible time. If unsolicited grant is used with a proper selection of the rate of the grants, optimal access is guaranteed. However, since the message generation can be quite random, much grants and thus resources can be wasted. If the data generated by each move of the player is fixed, the optimal resource usage with guaranteed access delay to a certain degree can be achieved by using the real-time polling scheduling algorithm.

Referring to FIG. 4, a message flow diagram showing the process for a player to join an ongoing e-game session is shown. As described above, SAP may be used to multicast gaming information, which also includes the QoS, security and billing information associated with the gaming session. Sessions are described using SDP. SAP announcer periodically multicasts packets containing the description of the session to a well-known multicast IP address and port. When a player initiates a communication or e-game session, the session information is registered with the local SAP server. A new player can listen to the well known IP address or port to receive the SAP message containing the session information. For example, the SAP message may contain the session title, QoS class and billing information, multicast address, IP address of the game host, etc. The following shows the SAP message header with extended SDP according to the present invention.

| 0 | 8 | 16 | 32 |
|---|---|---|---|
| V = 1  A  R  T  E  C | Auth Length | Msg ID hash | |
| Originating Source . . . | | | |
| Optional Authentication Data . . . | | | |
| Optional Payload Type . . . Application/SDP* | | | |
| Extended SDP* | | | |

The fields marked with an "*" indicates information added according to an embodiment of the present invention.

Referring to FIG. 4, a new player 90 desires to join an ongoing e-game session 92 involving multiple players 94–96, who are respectively associated with local game servers 98–100. Player 90 sends a session participation request message such as an SIP INVITE message to 104 to his/her local game server 102. The session participation request message includes an ALSO header which contains the multicast address of the game session that the new player wants to join as well as the QoS requirements of the new player. Further, the flag field of the Call-Disposition argument of the INVITE message is set to "REACH FIRST, " which indicates that only one current player needs to acknowledge the receipt of the INVITE message. Local game server 102 then multicasts 106 the SIP INVITE to all participants 94–96 of the game. The INVITE message reaches all the players current in the game, and at least one of the players replies with a 200-class OK message 108. If local game server 102 does not support multicasting, it may return a 600-class response to player 90. Player 90 then sends an INVITE message with an ALSO field containing the address of the host player obtained from the SAP/SDP message. The OK message may include a QoS requirement for the communication session. On receiving the OK message, local game server 102 communicates the QoS information of player 90 to a policy server 112. Policy server 112 makes an admission control decision at this point for the session, based on the requested QoS and resource availability in the access network. If resources can be allocated according to the QoS requirements, then the OK message 114 is forwarded to player 90. On receiving the OK message, player 90 or his/her computer sends an ACK message 116 to local game server 102. Local game server 102 then multicasts the ACK message 118 to all current game participants. The game host server (not shown) adds player 90 to the current state of the game, and player 90 is allowed to join in the ongoing game. All the current players and the new player then continue in the gaming session using multicast messages without any server involvement. The game session may be terminated using a SIP BYE message, which is sent via the local game servers.

Although the present invention has been described primarily in connection with e-gaming, it is equally applicable to a multi-user communication session where interactivity is desired. For example, the present invention may be used to implement a multimedia conference session between multiple users.

While the invention has been particularly shown and described by the foregoing detailed description, it will be understood by those skilled in the art that various changes, alterations, modifications, mutations and derivations in form and detail may be made without departing from the spirit and scope of the invention.

What is claimed is:

1. A method of setting up a multi-user communication session over a global computer network, comprising:

sending a session participation request message from a first user to a second user, the session participation request message including the first user's QoS requirements for the session;

receiving a negotiating message from the second user by the first user in response to the session participation request message, the negotiation message including the second user's QoS requirements for the session responsive to the first user's QoS requirements;

determining resource availability in access networks of the first and second users according to the second user's QoS requirements;

reserving resources in the respective access networks of the first and second users in response to resources being available to achieve the second user's QoS requirements; and sending an acknowledgement message from the first user to the second user in response to receiving the negotiating message to indicate the completion of QoS provisioning.

2. The method, as set forth in claim 1, wherein sending the session participation request message comprises sending a SIP INVITE message.

3. The method, as set forth in claim 1, wherein sending the session participation request message comprises sending an SIP INVITE message, with extended SDP specifying QoS requirements and security requirements.

4. The method, as set forth in claim 1, wherein sending the session participation request message comprises sending an SIP INVITE message with extended SDP specifying a latency requirement.

5. The method, as set forth in claim 1, wherein sending a negotiating message from the second user to the first user comprises sending a SIP OK message including a modification of the first user's QoS requirements.

6. The method, as set forth in claim 1, wherein sending a negotiating message from the second user to the first user comprises sending a SIP OK message including the second user's QoS requirements being the same as the first user's QoS requirements.

7. The method, as set forth in claim 1, wherein sending the session participation request message comprises sending an SIP INVITE message, with extended SDP specifying a session classification indicative of QoS requirements for the communication session.

8. A method of setting up an e-gaming session played over a global computer network, comprising:

sending a session participation request message from a first player to a second player via a first game server, the session participation request message including the first player's QoS requirements for the session;

receiving a negotiating message from the second player via a second game server by the first player in response to the session participation request message, the negotiation message including the second player's QoS requirements for the session responsive to the first player's QoS requirements;

determining resource availability in the first player's access network according to the second player's QoS requirements and reserving resources in the first player's access network in response to resources being available to achieve the second player's QoS requirements; and sending an acknowledgement message from the first player directly to the second player in response to receiving the negotiating message to indicate the completion of QoS provisioning.

9. The method, as set forth in claim 8, further comprising:

determining resource availability in the second player's access network according to the second player's QoS requirements; and reserving resources in the second player's access network in response to resources being available to achieve the second player's QoS requirements.

10. The method, as set forth in claim 8, wherein sending the session participation request message comprises sending a SIP INVITE message.

11. The method, as set forth in claim 8, wherein sending the session participation request message comprises sending an SIP INVITE message with extended SDP specifying QoS requirements and security requirements.

12. The method, as set forth in claim 8, wherein sending the session participation request message comprises sending an SIP INVITE message with extended SDP specifying a game format type, a latency requirement, and a game classification.

13. The method, as set forth in claim 8, wherein sending a negotiating message from the second player to the first player comprises sending a SIP OK message including a modification of the first player's QoS requirements.

14. The method, as set forth in claim 8, wherein sending a negotiating message from the second player to the first player comprises sending a SIP OK message including the second player's QoS requirements being the same as the first player's QoS requirements.

15. The method, as set forth in claim 8, wherein sending the session participation request message comprises sending an extended SIP INVITE message specifying a game classification indicative of QoS requirements for the e-gaming session.

16. The method, as set forth in claim 8, further comprising:

determining an address of a second game server which the second user is logged on;

sending the session participation request message from the first player to the second player via the first and second game servers; and sending the negotiating message from the second player to the first player also via the first and second game servers.

17. The method, as set forth in claim 8, further comprising preparing billing records in response to the reserved resources and QoS requirements for the session.

18. A multi-user communication system over a global computer network, comprising:

a first server onto which a first user is logged;

a first policy server in communication with the first server;

a second server onto which a second user is logged;

a second policy server in communication with the second server;

the first user sending a session participation request message to the second user via the first and second servers, the session participation request message including the first user's QoS requirements for the session;

the second user sending a negotiating message to the second server in response to receiving the session participation request message, the negotiation message including the second user's QoS requirements for the session responsive to the first user's QoS requirements;

the second policy server determining resource availability in the second user's access network according to the second user's QoS requirements and reserving resources in the second user's access network in response to resources being available to achieve the second user's QoS requirements;

forwarding the negotiating message from the second server to the first server;

the first policy server determining resource availability in the first user's access network according to the second user's QoS requirements and reserving resources in the first user's access network in response to resources being available to achieve the second user's QoS requirements;

forwarding the negotiating message from the first server to the first user; and sending an acknowledgement message directly from the first user to the second user in response to receiving the negotiating message to indicate the completion of QoS provisioning.

19. The system, as set forth in claim 18, wherein sending the session participation request message comprises sending a SIP INVITE message.

20. The system, as set forth in claim 18, wherein sending the session participation request message comprises sending an SIP INVITE message with extended SDP specifying QoS requirements and security requirements.

21. The system, as set forth in claim 18, wherein sending the session participation request message comprises sending an SIP INVITE message with extended SDP specifying a latency requirement.

22. The system, as set forth in claim 18, wherein sending a negotiating message from the second user to the first user comprises sending a SIP OK message including a modification of the first user's QoS requirements.

23. The system, as set forth in claim 18, wherein sending a negotiating message from the second user to the first user comprises sending a SIP OK message including the second user's QoS requirements being the same as the first user's QoS requirements.

24. The system, as set forth in claim 18, wherein sending the session participation request message comprises sending an SIP INVITE message with extended SDP specifying a session classification indicative of QoS requirements for the communication session.

25. The system, as set forth in claim 18, wherein sending the acknowledgement message comprises sending an SIP ACK message.

26. A local communication system, comprising:
means for receiving logging in information from a user local to the local communication system;
means for receiving a request for a communication session with a second user from the first user;
means for sending a session participation request message to a second local communication system associated with the second user, the session participation request message including the first user's QoS requirements for the communication session;
means for receiving a negotiation message from the second local communication system, session responsive to the first user's QoS requirements;
means for determining resource availability in access network of the first user according to the second user's QoS requirements and reserving resources in the first user's access network; and
means for sending an acknowledgement message directly from the first user to the second user in response to receiving the negotiation message.

27. The system, as set forth in claim 26, wherein the means for sending the session participation request message comprises means for sending a SIP INVITE message.

28. The system, as set forth in claim 26, wherein the means for sending the session participation request message comprises mans for sending an SIP INVITE message with extended SDP specifying QoS requirements and security requirements.

29. The system, as set forth in claim 26, wherein the means for sending the session participation request message comprises means for sending an SIP INVITE message with extended SDP specifying a latency requirement.

30. The system, as set forth in claim 26, wherein the means for receiving a negotiating message from the second local communication system comprises means for sending a SIP OK message including a modification of the first user's QoS requirements.

31. The system, as set forth in claim 26, wherein the means for receiving a negotiating message comprises means for sending a SIP OK message including the second user's QoS requirements being the same as the first user's QoS requirements.

32. The system, as set forth in claim 26, wherein the means for sending the session participation request message comprises means for sending an SIP INVITE message with extended SDP specifying a session classification indicative of QoS requirements for the communication session.

33. The system, as set forth in claim 26, wherein means for sending the acknowledgement message comprises means for sending an SIP ACK message.

34. A computer-enabled method for a multi-user communication session over a global computer network, comprising:
allowing a first user to log-in at a web site stored at a first local server;
receiving, from the first user, an identification of a second user for the communication session;
sending a first message to the second user via a second local server, the first message including the first user's QoS requirements for the communication session;
receiving a second message from the second user via the second local server in response to the first message, the second message including the second user's QoS requirements for the session responsive to the first user's QoS requirements;
determining resource availability in access networks of the first user according to the second user's QoS requirements;
reserving resources in an access network of the first user in response to resources being available to achieve the second user's QoS requirements; and
sending a third message directly to the second user in response to receiving the second message to indicate the completion of QoS provisioning.

35. The method, as set forth in claim 34, wherein sending the first message comprises sending an SIP INVITE message with extended SDP specifying QoS requirements and security requirements.

36. The method, as set forth in claim 34, wherein sending the first message comprises sending an SIP INVITE message with extended SDP specifying a latency requirement.

37. The method, as set forth in claim 34, wherein receiving a second message comprises receiving a SIP OK message including a modification of the first user's QoS requirements.

38. A computer-enabled method for a multi-user communication session over a global computer network, comprising:

allowing a first user to log-in at a web site stored at a first local server, receiving a first message from the user via the first local server and a second local server, the first message including the first user's QoS requirements for the communication session;

sending a second message to the first user via the second local server and the first local server in response to the first message, the second message including the second user's QoS requirements for the session responsive to the first user's QoS requirements;

determining resource availability in access networks of the second user according to the first user's QoS requirements;

reserving resources in an access network of the second user in response to resources being available to achieve the second user's QoS requirements; and receiving a third message directly from the first user in response to receiving the second message to indicate the completion of QoS provisioning.

39. The method, as set forth in claim 38, wherein receiving the first message comprises receiving an SIP INVITE message with extended SDP specifying QoS requirements and security requirements.

40. The method, as set forth in claim 38, wherein receiving the first message comprises receiving an SIP INVITE message with extended SDP specifying a latency requirement.

41. The method, as set forth in claim 38, wherein sending a second message comprises sending a SIP OK message including a modification of the first user's QoS requirements.

* * * * *